(12) United States Patent
Berry et al.

(10) Patent No.: US 8,482,237 B2
(45) Date of Patent: Jul. 9, 2013

(54) MOTOR TEMPERATURE ESTIMATION BASED ON THERMAL MODEL

(75) Inventors: Daniel J. Berry, Macomb Township, MI (US); Pankaj Mithal, Ann Arbor, MI (US); Paul F. Turnbull, Canton, MI (US); Peter J. Savagian, Bloomfield Hills, MI (US); Chia-Chou Yeh, Gardena, CA (US); Steven E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 13/039,347

(22) Filed: Mar. 3, 2011

(65) Prior Publication Data

US 2012/0226483 A1 Sep. 6, 2012

(51) Int. Cl.
*H02H 7/08* (2006.01)
(52) U.S. Cl.
USPC ............... 318/471; 318/490; 318/473; 703/2; 703/8; 374/45; 374/102; 374/103; 236/67; 236/71; 236/74 R
(58) Field of Classification Search
USPC ................ 361/25, 27, 31, 103; 318/471, 490, 318/473; 703/2, 8; 374/45, 102, 103; 236/67–104

See application file for complete search history.

(56) References Cited

U.S. PATENT DOCUMENTS

| 4,547,826 | A * | 10/1985 | Premerlani ..................... 361/25 |
| 6,959,239 | B2 * | 10/2005 | Williams et al. ............... 701/55 |
| 8,013,565 | B2 * | 9/2011 | Miura .......................... 318/811 |
| 8,037,737 | B2 * | 10/2011 | Recouvreur et al. ......... 73/23.31 |
| 2012/0007532 | A1 * | 1/2012 | Baglino et al. ............... 318/473 |

* cited by examiner

*Primary Examiner* — Rita Leykin
(74) *Attorney, Agent, or Firm* — Quinn Law Group, PLLC

(57) ABSTRACT

A vehicle includes a power source, a motor, and a computing device. The power source provides electrical energy to the motor, and the motor generates rotational motion from the electrical energy received. The computing device is configured to estimate a temperature of the motor in real time based at least in part on a thermal model of the motor. The thermal model includes a plurality of nodes and at least one thermal resistance. Each node represents a region of the motor and each thermal resistance represents a heat transfer path between at least two of the nodes. A method includes solving one or more energy balance equations to determine a temperature change at each node and estimating the temperature of the motor in real time based at least in part on the temperature change at each node and at least one of the thermal resistances in the thermal model.

20 Claims, 1 Drawing Sheet

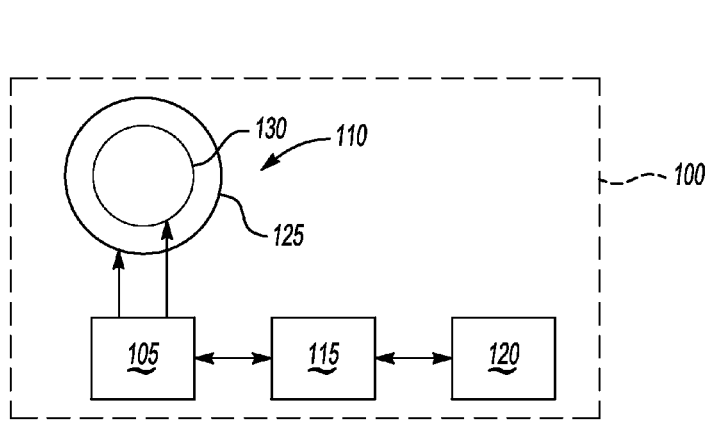
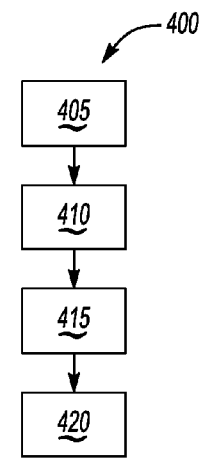
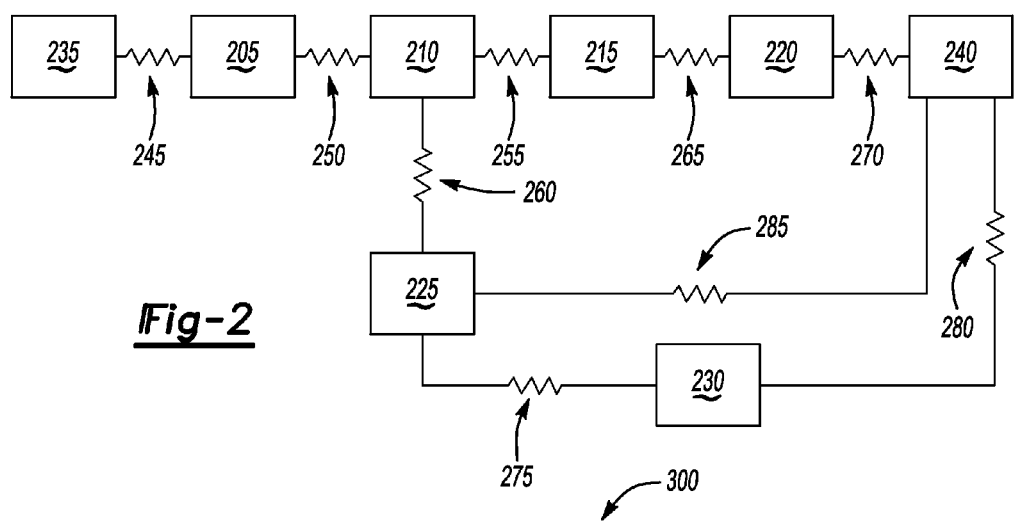
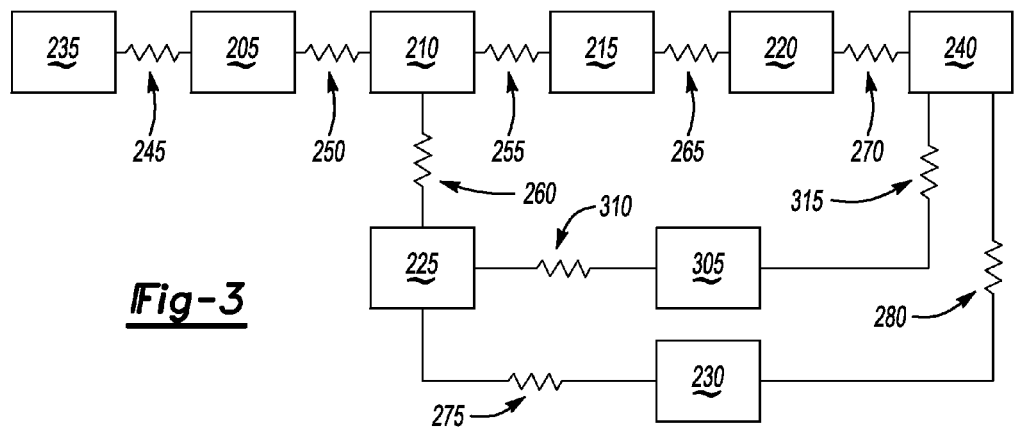
Fig-1
Fig-4
Fig-2
Fig-3

MOTOR TEMPERATURE ESTIMATION BASED ON THERMAL MODEL

TECHNICAL FIELD

The disclosure relates to estimating a motor temperature based on a thermal model.

BACKGROUND

A hybrid or battery-powered vehicle may use a motor that generates a torque to propel the vehicle. The motor may generate rotational motion from electrical energy (e.g., direct current or alternating current energy). The rotational motion from the motor may be transferred to wheels of the vehicle, and the torque provided to the wheels may be proportional to the rotational motion of the motor.

SUMMARY

An example vehicle includes a power source, a motor, and a computing device. The power source is configured to provide electrical energy. The motor is configured to generate rotational motion from the electrical energy received from the power source. The computing device is configured to estimate a temperature of the motor in real time based at least in part on a thermal model of the motor. The thermal model includes a plurality of nodes and at least one thermal resistance. Each node represents a region of the motor and each thermal resistance represents a heat transfer path between at least two of the nodes.

An example method includes receiving a thermal model of a motor, solving, via a computing device, an energy balance equation for each node in the thermal model to determine a temperature change at each node, and estimating the temperature of the motor in real time based at least in part on the temperature change at each node and at least one of the thermal resistances in the thermal model.

The features and advantages of the present disclosure are readily apparent from the following detailed description of the best modes for carrying out the invention when taken in connection with the accompanying drawings.

BRIEF DESCRIPTION OF THE DRAWINGS

FIG. 1 is a schematic diagram of an example vehicle having a motor, a power source, and a computing device.

FIG. 2 is a schematic diagram of an example thermal model of a permanent magnet motor.

FIG. 3 is a schematic diagram of an example thermal model of an induction motor.

FIG. 4 is a flowchart of an example process that may be used to estimate the temperature of a motor.

DETAILED DESCRIPTION

A vehicle is provided that is able to estimate a temperature of, e.g., an electric motor in real time based at least in part on a thermal model of the motor. The thermal model may be expressed as one or more energy balance equations that may be used by a computing device within the vehicle to accurately estimate the temperature of various regions of the motor. The computing device may further estimate the motor temperature based on the temperature at each region. The vehicle may take many different forms and include multiple and/or alternate components and facilities. While an example vehicle is shown in the Figures, the components illustrated in the Figures are not intended to be limiting. Indeed, additional or alternative components and/or implementations may be used.

Referring to FIG. 1, the vehicle 100 may include a power source 105, a motor 110, a computing device 115, and a memory device 120. The vehicle 100 may be any passenger or commercial automobile such as a hybrid electric vehicle including a plug-in hybrid electric vehicle (PHEV) or an extended range electric vehicle (EREV), a battery electric vehicle (BEV), fuel-cell vehicle, or the like.

The power source 105 may include any device, such as one or more batteries, configured to provide electrical energy to, e.g., one or more components of the vehicle 100. The power source 105 may further include or be in electrical communication with an inverter (not shown) configured to convert the electrical energy stored in the power source 105 from, for instance, direct current (DC) energy into alternating current (AC) energy. The power source 105 may be further configured to receive and store electrical energy provided by, for instance, a generator. Thus, the inverter may be configured to convert the AC energy provided by the generator into DC energy for storage in the power source 105.

The motor 110 may include any device configured to convert electrical energy into rotational motion. As such, the motor 110 may be an induction motor, a permanent magnet motor, a switched reluctance synchronous motor, a separately excited wound rotor, etc. In any event, the motor 110 may be configured to receive electrical energy from the power source 105 either directly or via the inverter, and produce a torque in accordance with the electrical energy received. The vehicle 100 may include any number of motors 110.

In one possible implementation, the motor 110 may include a stator 125 and a rotor 130. The stator 125 may include any device that remains stationary relative to the rotor 130 during operation of the motor 110 and that generates an electromagnetic field using, e.g., an electromagnet or a permanent magnet. The rotor 130 may include any device that rotates relative to the stator 125 during operation of the motor 110 to generate rotational motion, and thus, torque. Like the stator 125, the rotor 130 may generate an electromagnetic field using, e.g., an electromagnet or a permanent magnet. If either the rotor 130 or stator 125 includes an electromagnet, the electrical energy needed to generate the electromagnetic field may come from the power source 105. The interaction of the electromagnetic fields of the rotor 130 and stator 125 may cause the rotor 130 to rotate relative to the stator 125. As such, the direction, speed, and output torque of the motor 110 may be controlled based on the electrical energy provided to the rotor 130, the stator 125, or both.

During operation, different regions of the motor 110 may generate and transfer heat at different rates. For instance, the rotor 130 and/or stator 125 may include flux-producing and non-flux-producing regions formed from a metal, such as iron. Moreover, the rotor 130 and/or stator 125 may include windings formed from, e.g., copper that generates the magnetic field when provided with electrical energy. The electrical energy provided to the rotor 130 and/or stator 125 that causes the motor 110 to generate rotational motion may also generate heat at various regions of the motor 110, and the heat generated in one region of the motor 110 may be transferred to another region of the motor 110 via a heat transfer path through, e.g., convection or conduction. Cooling techniques may be applied to one or more regions (e.g., thermal loss regions) of the motor 110 to remove heat from various regions of the motor 110. As described in greater detail below with respect to FIGS. 2 and 3, the temperature of each motor 110 may be estimated in real time using a thermal model that accounts for the heat generated and removed (e.g., due to cooling) at various regions of the motor 110.

The computing device 115 may include any device configured to estimate the temperature of the motor 110 in real time based, at least in part, on the thermal model of the motor 110. For instance, the thermal model may be expressed as one or more energy balance equations representing the temperature of each region of the motor 110 represented in the thermal model. The computing device 115 may be configured to solve the energy balance equations to determine the temperature at each region. The computing device 115 may further determine a change in the temperature at each region over time by solving the energy balance equation at each region at two or more time steps. The computing device 115 may estimate the temperature of the motor 110 based on the temperature or the change in temperature over time at each region.

Each energy balance equation may be derived from the thermal model. In one possible implementation, the energy balance equations solved by the computing device 115 may be first order differential equations. Each energy balance equation may consider the temperature at one or more regions, including thermal loss regions, and one or more heat transfer paths associated with each region. As discussed below, each heat transfer path may be based upon various physical characteristics of the components that make up the motor 110.

The temperature of each region represented in the thermal model may depend upon the operating conditions of the motor 110. Accordingly, the computing device 115 may be configured to derive information about the operating conditions of the motor 110 based on, e.g., the speed, torque, or current generated by the motor 110. The computing device 115 may, in one possible implementation, be configured to determine the speed and/or torque generated by the motor 110 based on the amount of electrical energy provided to the motor 110 from the power source 105. The computing device 115 may be further configured to compensate for thermal loss regions of the motor 110 due to, e.g., cooling techniques when determining the temperature at each region represented in the thermal model. Accordingly, the computing device 115 may determine the temperature at each region of the motor 110 represented in the thermal model from the operating conditions of the motor 110.

The computing device 115 may be configured to account for heat transfer paths between the various regions of the motor 110 represented in the thermal model when solving the energy balance equation and estimating the temperature of the motor 110. Heat transfer between regions of the motor 110 may be caused by conduction, convection, or the like. Some example physical characteristics considered by the computing device 115 may include one or more of the length, thermal conductivity, cross-sectional area, heat transfer coefficient, surface area, mass, and specific heat of the materials used to form the various components of the motor 110. The computing device 115 may be further configured to derive values associated with the physical characteristics of the different regions of the motor 110 or access those values from, e.g., a look-up table stored in the memory device 120, discussed below. The computing device 115 may use those values to solve the energy balance equation for each region of the motor 110 represented in the thermal model.

Although only one computing device 115 is illustrated in FIG. 1, the vehicle 100 may include any number of computing devices 115. In general, the computing device 115 may employ any of a number of computer operating systems and may include computer-executable instructions, where the instructions may be executable by one or more computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The memory device 120 may include any device configured to store information such as the energy balance equations, information that may be used by the computing device 115 to solve one or more of the energy balance equations, and/or any other information that may be used by the computing device 115. Like the computing device 115 the memory device 120 may include any non-volatile and/or volatile media. The information stored in the memory device 120 may be in one or more look-up tables. For example, the memory device 120 may store one or more look-up tables with information related to the temperature change of various heat generating or heat loss regions of the motor 110 given various operating conditions, the physical characteristics of the components of the motor 110, etc. The memory device 120 may store other information in the look-up tables as well, and while only one memory device 120 is shown, the look-up tables may be stored in multiple memory device 120s.

FIG. 2 is a schematic diagram of an example thermal model 200 of one type of motor 110. For instance, the computing device 115 may be configured to use the thermal model 200 of FIG. 2, or a similar thermal model, to estimate the temperature of a permanent magnet motor 110. As illustrated, the thermal model 200 includes eight nodes representing the temperature of various regions of the motor 110 given certain operating conditions and boundary conditions of, e.g., one or more components of the vehicle 100. However, more or fewer regions of the motor 110 and/or boundary conditions may be considered to estimate the temperature of the motor 110.

In one possible implementation, some of the nodes in the thermal model 200 may represent regions of the stator 125 and other nodes may represent regions of the rotor 130, and a temperature may be assigned to each node. That is, a first stator node 205 may represent the temperature at a non-flux producing region of the stator 125 (e.g., a stator iron). A second stator node 210 may represent the temperature at a flux producing region of the stator 125 (e.g., the stator iron). A third stator node 215 may represent the temperature of the copper used in the windings of the stator 125, such as the copper disposed between slots defined by the stator 125. A fourth stator node 220 may represent the temperature of the endturns of the copper used in the windings of the stator 125. A first rotor node 225 may represent the temperature from the permanent magnets used by the rotor 130. A second rotor node 230 may represent the temperature from a non-flux producing region of the rotor 130 (e.g., a rotor iron).

The thermal model 200 may further include additional nodes that represent various other regions of interest of the motor 110 independent of the stator 125 and the rotor 130. For instance, some nodes may represent the temperature of the oil used in the motor 110. In one example implementation, a first oil node 235 may represent the temperature of the oil in one region of the motor 110 and a second oil node 240 may represent the temperature of the oil in another region of the motor 110.

Each of the nodes in the thermal model 200 may be connected to at least one other node by one or more heat transfer paths. The thermal model 200 may, therefore, include thermal resistances representing the heat transfer paths between the nodes. For instance, a first thermal resistance 245 may represent convective external heat transfer between the regions represented by the first oil node 235 and the first stator node 205. A second thermal resistance 250 may represent conduction between the regions represented by the first stator node 205 and the second stator node 210 via, e.g., the stator stack. A third thermal resistance 255 may represent conduction between the regions represented by the second stator node 210 and the third stator node 215 via, e.g., the stator stack, copper windings, and an insulation system. A fourth thermal resistance 260 may represent heat transfer through, e.g., an air gap between the regions represented by the second stator node 210 and the first rotor node 225. A fifth thermal resistance 265 may represent conduction through copper windings between the regions represented by the third stator node 215 and the fourth stator node 220. A sixth thermal resistance 270 may represent convection between the regions represented by the fourth stator node 220 and the second oil node 240, e.g., from the oil to the endturns of the stator 125. A seventh thermal resistance 275 may represent conduction through the rotor core between the regions represented by the first rotor node 225 and the second rotor node 230. An eighth thermal resistance 280 may represent the heat transfer path between the second rotor node 230 and the second oil node 240 caused by convection from the oil to the hub of the rotor 130. A ninth thermal resistance 285 may represent convection between the second oil node 240 and the first rotor node 225 (e.g., the rotor endrings).

FIG. 3 illustrates a thermal model 300 of another type of motor 110, e.g., an induction motor 110. As illustrated, the first stator node 205, the second stator node 210, the third stator node 215, the fourth stator node 220, the second rotor node 230, the first oil node 235, and the second oil node 240 are substantially the same as discussed above with respect to FIG. 2. In the thermal model 300 of FIG. 3, however, the first rotor node 225 may represent the temperature of the bars of the rotor 130. Additionally, the thermal model 300 includes a third rotor node 305 that may represent the temperature of the endrings of the rotor 130.

The first through eighth thermal resistances 245-280 of the thermal model 300 may be substantially the same as the corresponding thermal resistances 245-280 illustrated above with respect to the thermal model 200 of FIG. 2. The thermal model 300 of FIG. 3, however, further includes a ninth thermal resistance 310 that may represent the heat transfer between the regions represented by the first rotor node 225 and the third rotor node 305 that may be caused by conduction between the bars and endrings of the rotor 130. A tenth thermal resistance 315 may represent convective heat transfer between the regions represented by the third rotor node 305 and the second oil node 240 between the oil and the rotor endrings.

The computing device 115 may use the thermal model 200 of FIG. 2, the thermal model 300 of FIG. 3, or any other thermal model, to estimate the temperature of the motor 110. For instance, the thermal model may be presented to the computing device 115 as one or more first order differential equations defining the energy balance at each node. The computing device 115 may solve the energy balance equation at each of the nodes based on the temperature of the node and the thermal resistances associated with each node. Additionally, the computing device 115 may consider, as discussed above, the operating conditions of the motor 110 and the physical characteristics of the components that make up the motor 110. Further, computing device 115 may be configured to solve the energy balance equation at each node at a plurality of time steps, and estimate the temperature of the motor 110 based, at least in part, on the change in the temperature at each node over time. Moreover, with the thermal model, the computing device 115 may account for thermal loss regions as well as heat generating regions when estimating the temperature of the motor 110.

FIG. 4 is a flowchart of an example process 400 that may be used to estimate the temperature of the motor 110 in real time. This process 400 to estimate the temperature of the motor 110 considers the operating conditions of the motor 110 as well as the physical characteristics of the components that make up the motor 110.

At block 405, the thermal model of the motor 110 may be generated. Generating the thermal model may include identifying one or more regions of, e.g., the rotor 130 and stator 125, that have physical significance during operation of the motor 110. Generating the motor 110 may further include identifying heat transfer paths between the identified regions of the motor 110. The identified regions of the motor 110 may each be associated with a node and the identified heat transfer paths may each be associated with a thermal resistance. Additionally, an energy balance equation may be derived for each node that considers, e.g., the operating conditions of the motor 110, the physical characteristics of the components used in the motor 110, thermal loss regions of the motor 110, etc. The thermal model, including the equations defining the temperature at each node, may be stored in, e.g., the memory device 120.

At block 410, the computing device 115 may receive the thermal model of the motor 110. As discussed above, the thermal model may be expressed as one or more energy balance equations, such as one or more first order differential equations. Accordingly, the computing device 115 may access the energy balance equations defining the temperature at each node from the memory device 120.

At block 415, the computing device 115 may solve the energy balance equation for each node. As discussed above, the energy balance equation may be used by the computing device 115 to determine the temperature at each node. In one possible implementation, the computing device 115 may solve each energy balance equation at two or more time steps to determine the change in temperature at each node over time. The computing device 115 may access information stored in, e.g., a look-up table, from the memory device 120 to solve the energy balance equation.

At block 420, the computing device 115 may estimate the temperature of the motor 110 in real time based, at least in part, on the temperature or change in temperature at each node and the thermal resistances as defined by the thermal model via, e.g., the energy balance equations. The computing device 115 may be calibrated to estimate the temperature of the motor 110 to be the highest, lowest, average, etc., temperature of the regions. Alternatively, the computing device 115 may weigh the temperature of one or more regions higher than other regions, and thus, estimate the temperature of the motor 110 according to the weight given to each region.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a power source configured to provide electrical energy;
   a motor having a motor temperature and a plurality of motor regions, including a volume of oil used to cool the motor, and a flux-producing region, non-flux producing region, and winding region of a stator of the motor, wherein each of the plurality of regions has a corresponding region temperature, and wherein the motor is configured to receive electrical energy from the power source and generate rotational motion from the electrical energy received; and
   a computing device having a thermal model which estimates each region temperature, wherein the computing device is configured to estimate the motor temperature in real time based at least in part on the estimated region temperatures from the thermal model of the motor, wherein the thermal model includes a plurality of nodes and at least one thermal resistance;
   wherein each node represents a corresponding one of the regions of the motor and wherein each thermal resistance represents a heat transfer path between at least two of the nodes.

2. A vehicle as set forth in claim 1, wherein the computing device is configured to solve an energy balance equation for each node represented in the thermal model to estimate the temperature of the motor.

3. A vehicle as set forth in claim 2, wherein the computing device is configured to solve the energy balance equation for each node at a plurality of time steps.

4. A vehicle as set forth in claim 1, wherein the computing device is configured to estimate the temperature of the motor based at least in part on the temperature at each node.

5. A vehicle as set forth in claim 1, wherein the computing device is configured to estimate the temperature of the motor based at least in part on a change in the temperature at each node.

6. A vehicle as set forth in claim 1, wherein the computing device is configured to estimate the temperature of the motor based at least in part on the temperature at each node at a plurality of time steps.

7. A vehicle as set forth in claim 1, wherein the computing device is configured to estimate the temperature of the motor based at least in part on at least one of the thermal resistances.

8. A vehicle as set forth in claim 1, wherein at least one of the thermal resistances represents at least one of conductive and convective heat transfer in the motor.

9. A vehicle as set forth in claim 1, wherein a thermal loss is assigned to at least one of the nodes in the thermal model, and wherein the computing device is configured to estimate the temperature of the motor based at least in part on the thermal loss assigned to at least one of the nodes.

10. A vehicle as set forth in claim 1, wherein at least one of the thermal resistances is based at least in part on a physical characteristic of at least a portion of the motor.

11. A vehicle as set forth in claim 1, wherein each node in the thermal model is connected to at least one other node via one of the thermal resistances.

12. A vehicle as set forth in claim 1, further comprising a memory device configured to store information, and wherein the computing device is configured to estimate the temperature of the motor based at least in part on the information stored in the memory device.

13. A method comprising:
    receiving a thermal model of a motor having a motor temperature and a plurality of motor regions, including a volume of oil used to cool the motor and a flux-producing region, non-flux producing region, and winding region of a stator of the motor, wherein each of the plurality of regions has a corresponding region temperature, wherein the thermal model includes a plurality of nodes and at least one thermal resistance, and wherein each of the nodes represents a corresponding one of the regions of the motor and the thermal resistance represents a heat transfer path between at least two of the nodes;
    solving, via a computing device, an energy balance equation for each node in the thermal model to determine a temperature change at each node; and
    estimating the motor temperature in real time based at least in part on the temperature change at each node and at least one of the thermal resistances in the thermal model.

14. A method as set forth in claim 13, wherein solving the energy balance equation includes solving the energy balance equation at each node at a plurality of time steps to determine the temperature change at each node over time.

15. A method as set forth in claim 14, wherein the temperature change includes temperature rise, and wherein estimating the temperature of the motor includes estimating the temperature of the motor in real time based at least in part on the temperature change at each node.

16. A method as set forth in claim 13, wherein solving the energy balance equation includes compensating for physical characteristics of the motor.

17. A method as set forth in claim 13, wherein solving the energy balance equation includes compensating for thermal loss regions of the motor.

18. A method as set forth in claim 13, wherein solving the energy balance equation includes accessing information from a look-up table.

19. A method as set forth in claim 13, further comprising generating the thermal model of the motor, wherein generating the thermal model includes:
    identifying a plurality of regions of the motor;
    identifying at least one heat transfer path connecting at least two of the regions of the motor;
    associating each of the identified regions with one of the nodes and each of the identified heat transfer paths with a thermal resistance; and
    deriving an energy balance equation for each node.

20. The vehicle of claim 1, wherein the computing device estimates the motor temperature to be the highest, the lowest, or the average of the estimated region temperatures.

* * * * *